(12) United States Patent
Tinnin et al.

(10) Patent No.: US 8,850,918 B2
(45) Date of Patent: Oct. 7, 2014

(54) POSITIVE LOCK FOR RAKING AND TELESCOPING STEERING COLUMN

(75) Inventors: Melvin L. Tinnin, Clio, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 211 days.

(21) Appl. No.: 13/484,669

(22) Filed: May 31, 2012

(65) Prior Publication Data

US 2012/0304797 A1 Dec. 6, 2012

Related U.S. Application Data

(60) Provisional application No. 61/493,097, filed on Jun. 3, 2011.

(51) Int. Cl.
*B62D 1/16* (2006.01)
*B62D 1/18* (2006.01)
*B62D 1/184* (2006.01)

(52) U.S. Cl.
CPC ........................................ *B62D 1/184* (2013.01)
USPC ............................... 74/493; 74/492; 280/775

(58) Field of Classification Search
USPC ........... 74/492, 493, 494, 495, 496, 497, 498, 74/422; 280/775, 776, 777, 779
See application file for complete search history.

(56) References Cited

U.S. PATENT DOCUMENTS

| | | | |
|---|---|---|---|
| 4,541,298 A | 9/1985 | Strutt | |
| 4,658,664 A | 4/1987 | Jacobs et al. | |
| 5,394,767 A | 3/1995 | Hoblingre et al. | |
| 5,606,891 A | 3/1997 | Tisell et al. | |
| 5,722,299 A | 3/1998 | Yamamoto et al. | |
| 6,139,057 A | 10/2000 | Olgren et al. | |
| 6,460,427 B1 * | 10/2002 | Hedderly | 74/493 |
| 6,679,508 B2 | 1/2004 | Smith, Jr. et al. | |
| 6,766,712 B2 | 7/2004 | Koellisch et al. | |
| 6,952,979 B2 | 10/2005 | Cartwright et al. | |
| 7,331,608 B2 | 2/2008 | Armstrong et al. | |
| 7,533,594 B2 | 5/2009 | Menjak et al. | |
| 7,685,903 B2 | 3/2010 | Streng et al. | |
| 7,827,880 B2 | 11/2010 | Riefe et al. | |
| 8,201,475 B2 | 6/2012 | Rouleau et al. | |
| 8,327,733 B2 | 12/2012 | Ozsoylu et al. | |
| 2009/0114055 A1 | 5/2009 | Stroud | |
| 2009/0241721 A1 | 10/2009 | Inoue et al. | |
| 2010/0288068 A1 | 11/2010 | Klukowski | |
| 2010/0300236 A1 * | 12/2010 | Goulay et al. | 74/493 |
| 2010/0301593 A1 | 12/2010 | Sakata | |
| 2011/0185839 A1 | 8/2011 | Inoue | |
| 2013/0174685 A1 | 7/2013 | Yamamoto | |

* cited by examiner

*Primary Examiner* — Troy Chambers
*Assistant Examiner* — Jake Cook
(74) *Attorney, Agent, or Firm* — Cantor Colburn LLP

(57) ABSTRACT

An exemplary adjustable steering column comprises a gear positioned and configured to cause a shaft to rotate about its central axis as the steering column telescopes. The position lock further comprises one or more telescoping friction plates arranged and configured so as to rotate with the shaft when the steering column telescopes. The position lock further comprises one or more raking friction plates, each raking friction plate being positioned in frictional contact with at least one of the one or more telescoping friction plates and configured to exhibit a different rotation than the one or more telescoping friction plates when the steering column telescopes. The shaft imposes a compressive load between the one or more telescoping friction plates and the one or more raking friction plates so as to induce friction between the telescoping friction plates and the raking friction plates and thereby resist their relative movement.

20 Claims, 3 Drawing Sheets

POSITIVE LOCK FOR RAKING AND TELESCOPING STEERING COLUMN

RELATED APPLICATIONS

The present patent application claims the benefit of priority from U.S. provisional patent application No. 61/493,097 filed Jun. 3, 2011.

BACKGROUND OF THE INVENTION

The present invention relates generally to locking mechanisms for steering columns and more specifically to a positive lock for a raking and telescoping steering column.

Traditional steering column locks employ friction plates or interlocking teeth arranged along the raking and telescoping ranges of motion of the steering column. Such locks can be cumbersome and relatively bulky and often do not permit continuous adjustments throughout the range of motion of the steering column.

Accordingly, it is desirable to have a steering column lock that is compact in size and permits continuous adjustments throughout the range of motion of the steering column.

SUMMARY OF THE INVENTION

In a first aspect, an exemplary adjustable steering column comprises a position lock for resisting raking and telescoping movement of the steering column. The position lock comprises a gear positioned and configured to cause a shaft to rotate about its central axis as the steering column telescopes. The position lock further comprises one or more telescoping friction plates arranged and configured so as to rotate with the shaft when the steering column telescopes. The position lock further comprises one or more raking friction plates, each raking friction plate being positioned in frictional contact with at least one of the one or more telescoping friction plates and configured to exhibit a different rotation than the one or more telescoping friction plates when the steering column telescopes. The shaft imposes a compressive load between the one or more telescoping friction plates and the one or more raking friction plates so as to induce friction between the telescoping friction plates and the raking friction plates and thereby resist their relative movement.

In another aspect, an exemplary method for selectively facilitating and resisting adjustments to a steering column comprises positioning and configuring a gear so as to cause a shaft to rotate about its central axis as the steering column telescopes. One or more telescoping friction plates are arranged and configured so as to cause the one or more telescoping friction plates to rotate with the shaft when the steering column telescopes. One or more raking friction plates are arranged and configured so as to exhibit a different rotation than the one or more telescoping friction plates when the steering column rakes. One or more raking friction plates are positioned so as to be in frictional contact with at least one of the one or more telescoping friction plates. A compressive load applied between the one or more telescoping friction plates and the one or more raking friction plates is selectively increased or decreased so as to selectively increase or decrease friction between the one or more telescoping friction plates and the one or more raking friction plates and thereby selectively resist or facilitate their relative movement.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
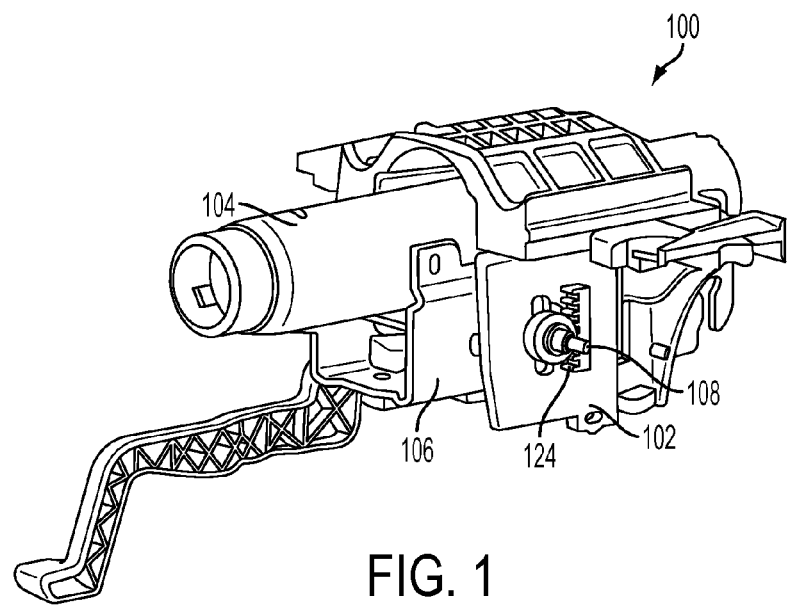
FIG. 1 is a drawing showing a perspective view of an exemplary steering column.

Referring now to the Figures, where the invention will be described with reference to specific embodiments, without limiting same, FIG. 1 shows a perspective view of an exemplary steering column 100, in which a position lock provides for an infinitely (i.e., continuously) variable raking and telescoping range of positions.

In general, an exemplary steering column 100 provides for positional locking and unlocking of a steering column 100, with an infinitely (i.e., continuously) variable raking and telescoping range of positions, by means of mechanical interaction between one or more telescoping friction plates 116 and one or more raking friction plates 114. The one or more telescoping friction plates 116 and the one or more raking friction plates 114 are arranged so as to be in frictional contact with one another, and to rotate relative to one another, upon raking and/or telescoping movement of the steering column 100, whereby frictional forces between the relatively moving plates 114, 116 may be encountered. These frictional forces, which tend to resist such raking and/or telescoping movement of the steering column 100, may be controlled by adjusting the compressive forces between adjacent plates 114, 116.

Accordingly, both telescoping adjustments and raking adjustments to the steering column may be selectively facilitated or inhibited by changing the compressive forces between adjacent plates 114, 116. To lock the steering column 100 in a particular position, the compressive load forcing adjacent plates together is increased. To permit adjustment of the steering column 100, the compressive load forcing adjacent plates together is decreased. Increasing or decreasing the compressive loads may be accomplished by modulation of a cam 112 that may be actuated by a lever or control arm. The control arm and/or the cam 112 may also be biased toward a position of cam 112 associated with high compressive loads so as to tend toward locking the position of the steering column 100.

In operation, as the position of the steering column 100 is adjusted (i.e., as a force is applied to the steering column 100 so as to cause the steering column 100 to undergo telescoping or raking movement), the plates 114, 116 are constrained such that, in connection with those adjustments to the position of the steering column, the plates 114, 116 must move relative to one another. Resistance to this relative movement is provided by friction between the plates 114, 116, which depends upon the compressive load between the plates 114, 116, and the surface properties of the plates 114, 116.

In one exemplary embodiment, a telescoping lock function (i.e., resistance to telescoping adjustments to the position of the steering column 100) is provided by forcing the rotation of the telescoping friction plates 116 against the raking friction plates 114 that are configured and positioned so as to resist that relative motion through friction between the plates 114, 116. In another exemplary embodiment, a rake lock function (i.e., resistance to raking adjustments to the position of the steering column 100) is provided by causing raking friction plates 114 to rotate against either fixed plates (not shown) as may be supported by a rake bracket 102 or against the one or more telescoping friction plates 116, which are constrained so as to remain stationary (e.g., when there is no telescoping movement of the steering column 100) or to independently rotate (e.g., when there is telescoping movement of the steering column 100).

Rotation of the raking friction plates 114 is coupled to the raking adjustments to the steering column 100 by interaction between the raking friction plates 114 and a set of gear teeth 126 that are positioned on the rake bracket 102 adjacent to toothed edges of the raking friction plates 114. In either of these cases, and/or in other possible configurations contemplated by this disclosure, raking of the steering column 100 causes relative motion (such as rotation) between the raking friction plates 114 and the adjacent plates, which may be the telescoping friction plates 116 or another stationary frictional surface for selectively resisting relative movement of the raking friction plates 114.

Figure 2:
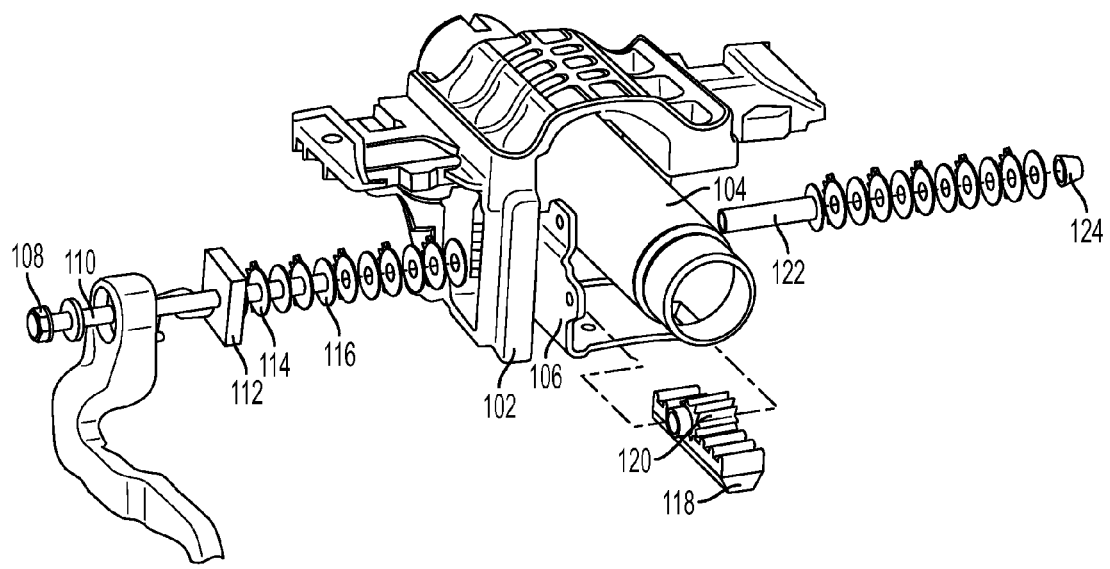
FIG. 2 is a drawing showing an exploded view of the steering column of FIG. 1.

As shown more clearly in FIG. 2, in an exemplary non-limiting embodiment, a locking steering column 100 comprises a rake bracket 102 disposed over an upper jacket 104. Upper jacket 104 is cylindrical in shape and defines a longitudinal axis along which the steering column 100 may extend, such as toward or away from an operator of the steering column 100 (i.e., telescoping motion). A control shaft (e.g., a bolt or another suitably configured, elongated member) 108 and a retainer 124 (e.g., a nut or another element suitably configured for cooperating with the control shaft 108) cooperate with one another so as to retain one or more raking friction plates 114, one or more telescoping friction plates 116, and a gear 120 to a compression bracket 106, which cradles the upper jacket 104. The control shaft 108 is oriented transversely to the longitudinal axis and is positioned so as to pass through the one or more raking friction plates 114, the one or more telescoping friction plates 116, the gear 120, and the compression bracket 106. Each of the one or more raking friction plates 114 and each of the one or more telescoping friction plates 116 are positioned alternatingly on the control shaft 108 so that each of the one or more raking friction plates 114 is positioned adjacent to one of the one or more telescoping friction plates 116.

In an exemplary non-limiting embodiment, a cross section of the control shaft 108 is non-circular, and the one or more telescoping friction plates 116 and the gear 120 each define a non-circular hole such that when the control shaft 108 passes through their respective non-circular holes, they are all constrained to rotate together as a unitary rotating group. In an exemplary embodiment the non-circular shape of control shaft 108 and the holes defined in the one or more telescoping friction plates 116 and the hole defined in the gear 120 each define one or more flat surfaces and/or edges so as to resist rotation relative to the control shaft 108. As one skilled in the art will appreciate, one or more set screws or tabs and grooves and/or splines could be arranged among the rotating group as to resist the aforementioned relative motion.

In another non-limiting exemplary embodiment, an outer edge of the one or more telescoping friction plates 116 and/or the one or more raking friction plates 114 define a non-circular outer edge, such as a gear tooth shaped edge, so as to enable the non-circular friction plate to cooperate with a corresponding gear that is configured to cause the non-circular friction plate to rotate as the steering column 100 is adjusted. Accordingly, relative motion between the one or more telescoping friction plates 116 and/or the one or more raking friction plates 114 is caused by adjustment of the steering column 100, with raking adjustment causing rotation of raking friction plates 114 and with telescoping adjustment causing different rotation of a telescoping friction plates 116, whereby controllable compression of the differently-rotating friction plates against one another and relative motion between the friction plates caused by raking and/or telescoping adjustment of the steering column 100, in combination, facilitates control over the locking of the position of the steering column 100.

While the elements of the above-described rotating group comprising the one or more telescoping friction plates 116 are constrained to operate as a group exhibiting a first rotational/translational characteristic associated with telescoping adjustments, the one or more raking friction plates 114 are also constrained to operate as a group exhibiting a second, different rotational/translational characteristic, (e.g., rotating differently from the telescoping friction plates 116 such as by remaining stationary relative to the compression bracket 106 or by being actuated by a different set of gear mechanisms) associated with raking adjustments. For example, stationary retention of the one or more raking friction plates 114 may be provided by interference between each of the one or more raking friction plates 114 and a surface defined in the compression bracket 106. In an exemplary embodiment, each of the one or more raking friction plates 114 defines an outer circumferential edge that is non-circular (such as square or having at least one flat edge). A surface of the compression bracket 106 defines a mating edge positioned and configured so as to resist rotation of each of the one or more raking friction plates 114 about the central axis of the control shaft 108 relative to the compression bracket 106.

Figure 5:
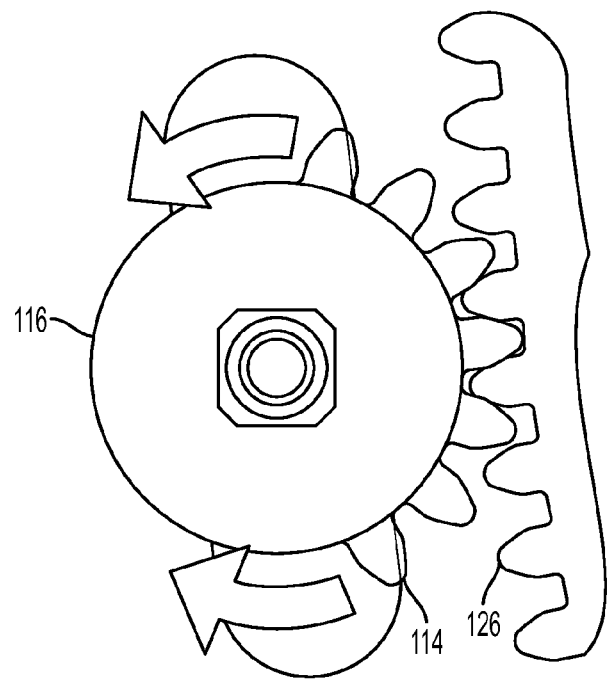
FIG. 5 is a drawing showing telescoping friction plates and raking friction plates of an exemplary steering column in relative movement according to a raking movement of the steering column.
Figure 6:
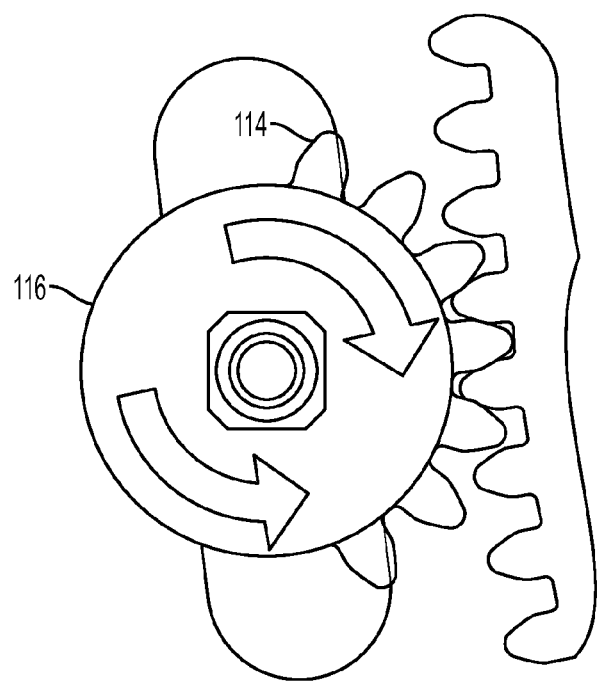
FIG. 6 is a drawing showing telescoping friction plates and raking friction plates of an exemplary steering column in relative movement according to a telescoping movement of the steering column.

Alternatively, in another exemplary and non-limiting embodiment, as shown in FIGS. 5 and 6, each of the one or more raking friction plates 114 may define an outer circumferential edge that is non-circular (such as defining a set of gear teeth 126 around the circumference of the raking friction plates 114). A surface of the compression bracket 106 defines a mating edge (such as a stationary set of complementary gear teeth 126) positioned and configured so as to cause each of the one or more raking friction plates 114 to rotate about the central axis of the control shaft 108 relative to the telescoping friction plates 116. Accordingly, relative motion (e.g., rotation) of the raking friction plates 114 may be caused by their interaction with a set of raking gears configured and positioned so as to cause the raking friction plates 114 to rotate as the steering column 100 is adjusted in a raking direction.

Figure 3:
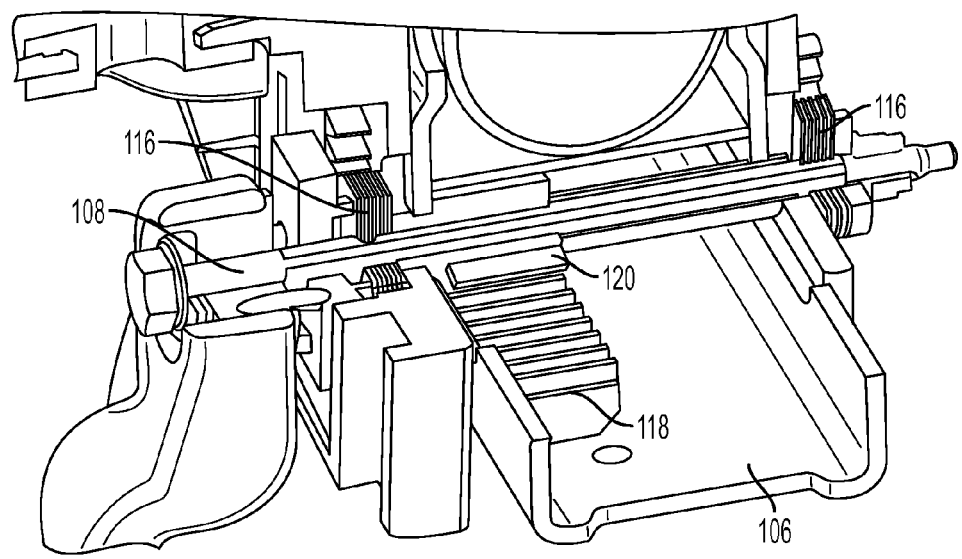
FIG. 3 is a drawing showing an expanded view of a portion of the steering column of FIG. 1.

In an exemplary non-limiting embodiment, the retainer 124 and control shaft 108 are arranged and configured so as to create a compressive load on the one or more raking friction plates 114 and the one or more telescoping friction plates 116 such that as the one or more raking friction plates 114 move relatively to the one or more telescoping friction plates 116, friction is created between the one or more raking friction plates 114 and the one or more telescoping friction plates 116. This friction produces resistance to telescoping and/or raking adjustment of the steering column 100. The tension in the control shaft 108, and thus the compressive force applied by the control shaft 108 to the one or more raking friction plates 114 and the one or more telescoping friction plates 116, may be adjusted by tightening or loosening the retainer 124 and or by actuating a cam 112. In an exemplary embodiment, cam 112 is positioned and configured so that when an operator rotates a handle attached to the cam 112, the position of the cam 112 changes so that the tension in the control shaft 108 also changes. One or more spacer 122 may be assembled to the control shaft 108 to provide positioning of the control shaft 108, and one or more springs may be positioned so as to establish and/or maintain the compressive force between the one or more raking friction plates 114 and the one or more telescoping friction plates 116. As one skilled in the art will appreciate, the plates may be constructed of any dimensionally stable material such as ceramic or metal. Materials resistant to corrosion such as stainless steel or galvanized metal may be employed to prevent corrosive bonding between the plates As shown in FIG. 3, in an exemplary, non-limiting embodiment, when telescoping the column 100, a rack 118 that is fixed to the compression bracket 106 causes the gear 120 to rotate about the central axis of the control shaft 108, and thus causing the control shaft 108 and the above-described rotating group to rotate as well. As described above, this rotation is resisted by friction between the one or more raking friction plates 114 and the one or more telescoping friction plates 116. The system may be locked so as to prevent telescoping motion by employing the cam 112 or another mechanism so as to increase the tension in the control shaft 108 and consequently the compressive force and friction between the one or more raking friction plates 114 and the one or more telescoping friction plates 116. As one skilled in the art will appreciate, automated mechanisms may be implemented so as to automatically lock the position of the steering column 100 (e.g., by causing an increase in compressive force) or automatically release the steering column 100 (e.g., by causing a decrease in compressive force) when desirable or advantageous.

Figure 4:
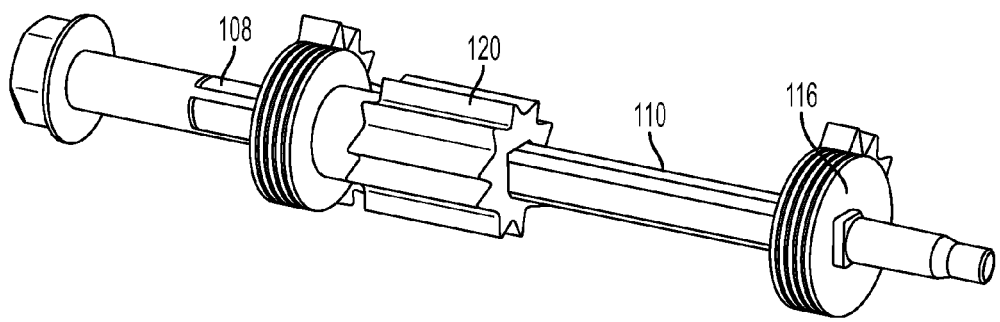
FIG. 4 is a drawing showing a perspective view of an exemplary control shaft, gear, and set of friction plates of the steering column of FIG. 1.

As shown in FIG. 4, in an exemplary, non-limiting embodiment, the components of the above-described rotating group include features, such as the flats 110 (or other eccentricities) on the control shaft 108 and the complementary non-circular (e.g., square) holes in the gear 120 and the telescoping friction plates 116, that interfere with rotation of the elements relative to the group. Accordingly, when the control shaft 108 rotates about its central axis, the elements of the rotating group (i.e., one or more telescoping friction plates 116, the gear 120, and optionally the cam 112) rotate with the control shaft 108. When the control shaft 108 is stationary, the elements of the rotating group remain stationary with the control shaft 108. As shown in FIG. 6, in an exemplary, non-limiting embodiment, rotation of the above-described telescoping friction rotating group differs from (i.e., is relative to) that of the one or more raking friction plates 114.

As shown in FIG. 5, in an exemplary, non-limiting embodiment, each of the one or more raking friction plates 114 is configured so as to provide for raking movement of the rotating group such as in a direction that is substantially transverse to the central axis of the control shaft 108. In the exemplary embodiment of FIG. 5, each of the one or more raking friction plates 114 is configured as a circular plate with its outer circumferential edge defining a set of gear teeth 126. Each of these gear teeth 126 are configured to interact with a corresponding set of gear teeth 126 of a raking gear. The interaction of the gear teeth 126 and the outer edges of the raking friction plates 114 during raking and telescoping adjustments causes the raking friction plates 114 to exhibit a rotational behavior that differs from the rotational behavior exhibited by the telescoping friction plates 116.

More specifically, as the steering column 100 is undergoing raking motion, gear teeth 126 are positioned so as to interact with mating gear teeth 126 of raking friction plates 114 as raking friction plates 114 translate with the raking movement of the steering column 100. Accordingly, the relative motion between the raking friction plates 114 and the telescoping friction plates 116 necessitated by raking motion can be resisted or prevented by friction, which can be controlled through tension in the control shaft 108. As the rotating group moves in this transverse direction (i.e., rakes), the motion of the one or more raking friction plates 114 relative to the motion of the one or more telescoping friction plates 116 enables frictional locking throughout a continuously variable range of raking positions of the steering column 100. It should be appreciated that the gear ratios associated with raking movement may differ from the gear ratios associated with telescoping movement.

Thus, an infinitely (i.e., continuously) variable raking and telescoping motion are accommodated by the steering column 100 while also providing for positional locking of the steering column 100 at any of the raking/telescoping positions within the range of continuously variable positions of the steering column 100. In addition, the system also accommodates the provision of a resistive force as the raking and/or telescoping positioning of the steering column 100 is adjusted. This resistive force can be adjusted by adjusting the tension in the control shaft 108 and/or by disposition of a spring. Thus, the compressive force between the plates can be adjusted so as to provide a desired feel to an operator of the steering column 100.

In an exemplary embodiment, the plates, when stacked and engaged to a stationary bracket, are caused by a gear profile or other synchronizing feature to rotate relatively to one another. Rake direction holding load performance is created by resistance to relative motion between plates. Variations in the number of plates and in the synchronizing feature profiles, in the plate materials, the compressive loads applied to the plates, the design of the plates, the surface finish of the plates, the disposition of springs, and other features can be adjusted to achieve desired locking and motion resisting characteristics while accommodating a desired range of motion. Component deformation (e.g., spring loading) can also be used so as to provide desired friction characteristics as the steering column 100 is adjusted. Telescoping motion is resisted by causing the rotating group to rotate relative to raking friction plates 114 as the steering column 100 is adjusted in the longitudinal direction. Raking motion is resisted by causing the raking friction plates 114 to rotate frictionally against the telescoping friction plates 116 as the steering column 100 is adjusted in a raking direction.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column comprising a position lock for resisting raking and telescoping movement of the steering column;
   the position lock comprising a gear positioned and configured to cause a shaft to rotate about its central axis as the steering column telescopes;
   the position lock further comprising one or more telescoping friction plates arranged and configured so as to rotate with the shaft when the steering column telescopes;
   the position lock further comprising one or more raking friction plates, each raking friction plate being positioned in frictional contact with at least one of the one or more telescoping friction plates and configured to exhibit a different rotation than the one or more telescoping friction plates when the steering column telescopes;
   the shaft imposing a compressive load between the one or more telescoping friction plates and the one or more raking friction plates so as to induce friction between the one or more telescoping friction plates and the one or more raking friction plates and thereby resist their relative movement.

2. An adjustable steering column as in claim 1, wherein the one or more telescoping friction plates are arranged so as to remain stationary with the shaft when the steering column rakes.

3. An adjustable steering column as in claim 1, wherein the compressive load may be adjusted by moving a cam.

4. An adjustable steering column as in claim 1, wherein steering column provides for a continuously variable raking and telescoping range of positions.

5. An adjustable steering column as in claim 1, further comprising a rake bracket disposed so as to cause the one or more raking friction plates to rotate relatively to the rake bracket as the steering column moves in a raking direction.

6. An adjustable steering column as in claim 1, wherein the shaft is positioned transversely to a longitudinal axis of the steering column.

7. An adjustable steering column as in claim 1, wherein the shaft passes through the one or more telescoping friction plates and the one or more raking friction plates.

8. An adjustable steering column as in claim 1, wherein a cross section of the shaft is non-circular, and the one or more telescoping friction plates and the gear each define a non-circular hole such that when the shaft passes through their respective non-circular holes, they are all constrained to rotate together as a unitary rotating group.

9. An adjustable steering column as in claim 8, wherein the non-circular shape of the shaft is square.

10. An adjustable steering column as in claim 5, wherein each of the one or more raking friction plates defines an outer circumferential edge that is non-circular so as to interact with to the rake bracket as the steering column moves in a raking direction.

11. A method for selectively facilitating and resisting adjustments to a steering column comprising:
    positioning and configuring a gear so as to cause a shaft to rotate about its central axis as the steering column telescopes;
    arranging and configuring one or more telescoping friction plates so as to cause the one or more telescoping friction plates to rotate with the shaft when the steering column telescopes;
    arranging and configuring one or more raking friction plates so as to exhibit a different rotation than the one or more telescoping friction plates when the steering column rakes;
    positioning one or more raking friction plates so as to be in frictional contact with at least one of the one or more telescoping friction plates; and
    selectively increasing or decreasing a compressive load applied between the one or more telescoping friction plates and the one or more raking friction plates so as to selectively increase or decrease friction between the one or more telescoping friction plates and the one or more raking friction plates and thereby resist or facilitate their relative movement.

12. A method as in claim 11, further comprising arranging the one or more telescoping friction plates are arranged so as to remain stationary with the shaft when the steering column rakes.

13. A method as in claim 11, further comprising adjusting the compressive load by moving a cam.

14. A method as in claim 11, further comprising providing a steering column having a continuously variable raking and telescoping range of positions.

15. A method as in claim 11, further comprising disposing a rake bracket disposed so as to cause the one or more raking friction plates to rotate relatively to the rake bracket as the steering column moves in a raking direction.

16. A method as in claim 11, further comprising positioning the shaft transversely to a longitudinal axis of the steering column.

17. A method as in claim 11, further comprising disposing the shaft so as to pass through the one or more telescoping friction plates and the one or more raking friction plates.

18. A method as in claim 11, further comprising configuring the shaft so as to have a non-circular cross section, and defining the one or more telescoping friction plates and the gear such that each define a non-circular hole that is complementary to the cross-section of the shaft, such that when the shaft passes through the non-circular holes the one or more telescoping friction plates and the gear, the shaft and the one or more telescoping friction plates and the gear are constrained to rotate together as a unitary rotating group.

19. A method as in claim 18, further comprising configuring the shaft so as to have a square cross section.

20. A method as in claim 15, further comprising defining an outer circumferential edge of each of the one or more raking friction plates so as to interact mechanically with the rake bracket as the steering column moves in a raking direction.

* * * * *